Sept. 20, 1932.  W. G. HORN  1,878,777
ELECTRIC OPERATING MECHANISM
Filed Jan. 20, 1930  2 Sheets-Sheet 1
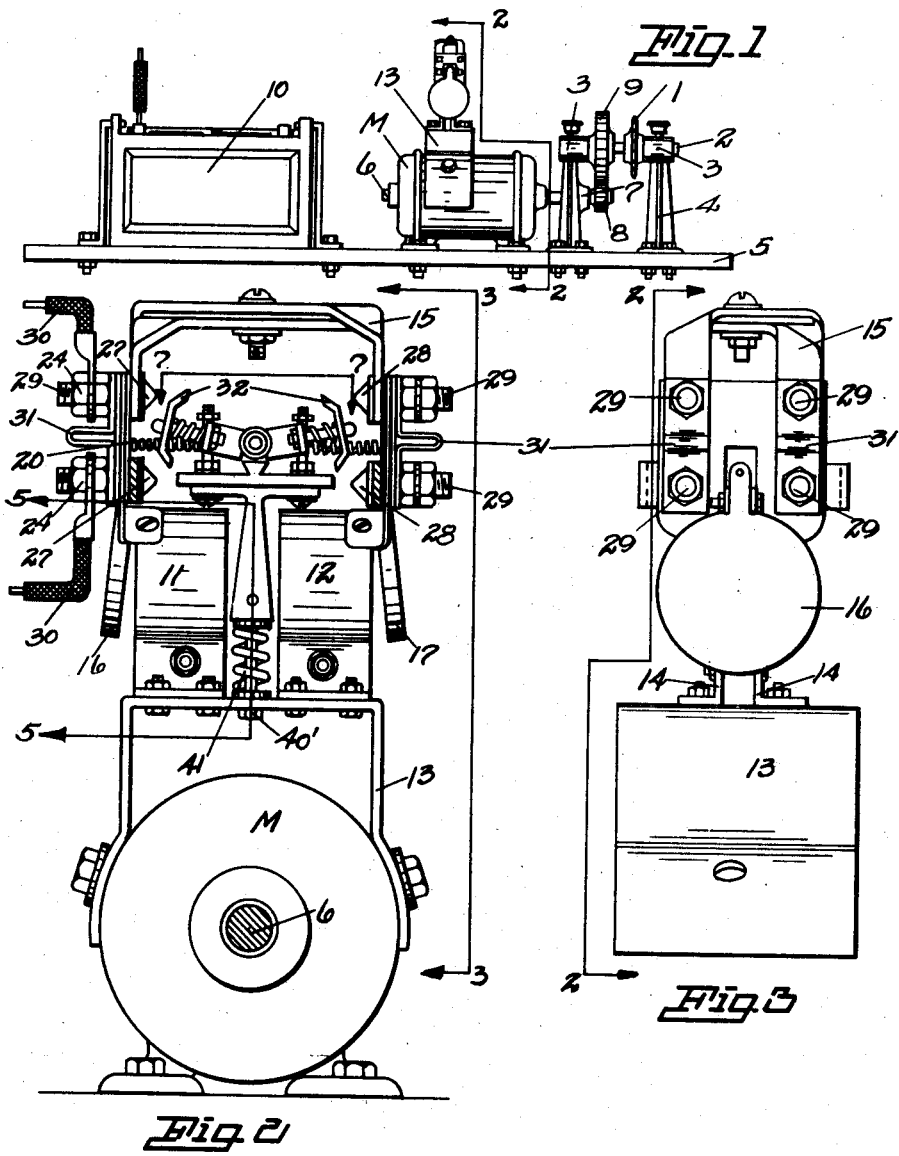
WILBERT G. HORN
Inventor
By Herbert E. Smith
Attorney Sept. 20, 1932.   W. G. HORN   1,878,777
ELECTRIC OPERATING MECHANISM
Filed Jan. 20, 1930    2 Sheets-Sheet 2

WILBERT G. HORN
Inventor

By Herbert E. Smith
Attorney

Patented Sept. 20, 1932

1,878,777

UNITED STATES PATENT OFFICE

WILBERT G. HORN, OF PILOT ROCK, OREGON

ELECTRIC OPERATING MECHANISM

Application filed January 20, 1930. Serial No. 421,977.

My present invention relates to an improved electric operating mechanism which while adapted for various uses, is particularly designed for use with agricultural implements, as gang plows, in raising or lowering the plows with relation to the ground surface, or to govern the depth of the cut of the plows.

In the customary operation of implements of this character, when the implement is drawn by a tractor, a plowman is necessarily required for manually controlling the position of the plows of the gang to regulate the depth to which the furrows are to be cut. By the employment of the operating mechanism of my invention, the services of the plowman are dispensed with; the electrical equipment of my invention is mounted partly on the tractor and partly on the implement frame; and a control switch is carried on the tractor where it is readily accessible for the driver of the tractor in controlling the movement of the operating mechanism on the implement or plow frame.

In carrying out my invention the mechanism may readily be installed as part of the equipment of the gang plow under process of manufacture, or the operating mechanism may with equal facility be assembled on an existing implement, connected with the depth regulating mechanism of the plows, and the manually operating means is dispensed with.

My invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a side view of the equipment of my invention showing the parts mounted on a base board, which board is in turn mounted in suitable manner upon the frame of the implement, as a gang plow.

Figure 2 is an enlarged view in side elevation of the electromagnetic control device and electric motor, the control device being in neutral or inoperative position, as at lines 2—2 of Figs. 1 and 3.

Figure 3 is an end view of the electromagnetic control device.

Figure 4:
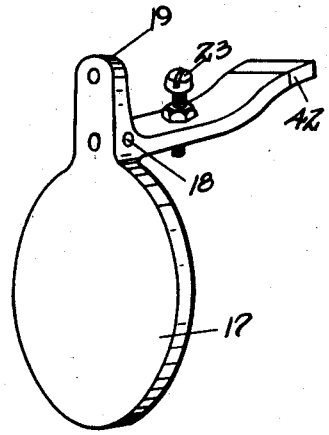
Figure 4 is a perspective view of one of the armatures of an electro-magnet in the control device.

In the adaptation of the operating mechanism of my invention to a gang plow, it will be understood that the plows of the implement are elevated or lowered by a sprocket chain that passes over a rotary drum of the implement, and said chain also passes over the sprocket wheel 1 mounted on the shaft 2 journaled in bearings 3 of the brackets 4, and the brackets are bolted on the base board 5, which board is suitably affixed to the frame of the implement.

Figure 8:
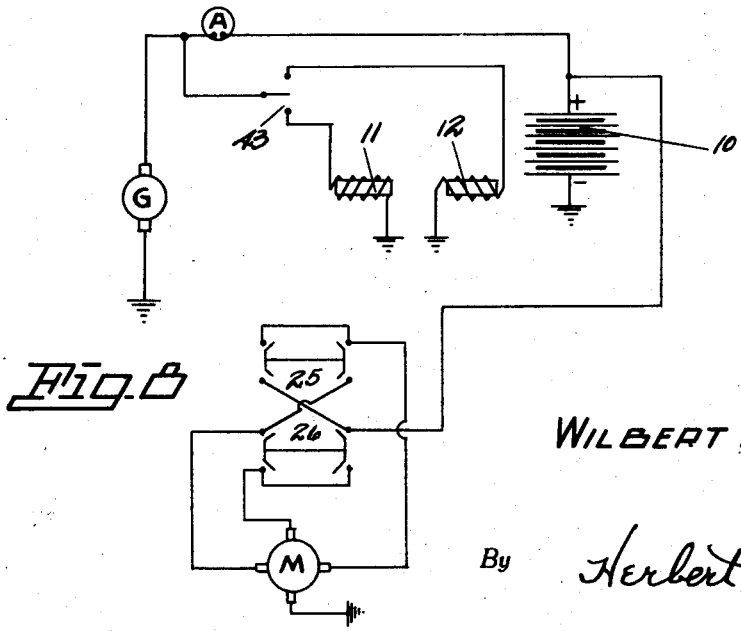
Figure 8 is a diagram of the wiring for the motor and the electromagnetic operating mechanism including the reversing switch, the control (manual) switch, the magnetic circuits and motor circuits.

The base board also supports an electric motor M and the shaft 6 of the motor is journaled in bearings 7 of the bracket 4. A pinion 8 on the motor shaft engages a larger gear 9 on the sprocket shaft 2, and the pinion, gear, sprocket wheels, chain, and shafts with the motor, thus provide a driving mechanism that is reversible, for raising or lowering the gang of plows, for various purposes, the electric current for the electro-magnetic reversing switch being supplied from the battery 10 or the generator G, and the latter also used for the motor M. The generator G, ammeter A and manually operated control switch 43 (Fig. 8) are readily accessible to the driver of the tractor, while the motor M, electromagnets 11 and 12 and other parts 25 and 26 of the reversing switch or circuit maker may be carried on the implement, the necessary wires for the various circuits being arranged as indicated in Figure 8.

The motor may be turned in either direction for operating the driving mechanism, and as shown I may use the motor for supporting the yoke 13 attached thereto, upon which yoke the reversing switch is mounted.

The two electro-magnets are spaced apart and supported from the yoke by means of brackets 14, and above the brackets an upper frame 15 is mounted, in which the armatures 16 and 17 of the respective magnets are pivoted, as at 18.

The armatures are suspended at the outer opposite ends of the magnets, and as seen in Figure 4 there armatures are in the form of disks fashioned with a radially extending perforated lug 19.

The lugs of the two armatures are connected by means of a spring 20, under sufficient tension to normally hold the armature disks retracted or away from their magnets as seen in Figure 2, but such tension is overcome when a magnet is energized to attract its armature, after one or the other of the magnets is de-energized the spring returns the armatures to neutral or normal position in Figure 2.

Each armature disk is fashioned with a laterally projecting locking arm, as 21 and 22, located above the respective magnets, and stop pins 23 in these arms, by contact with the top portions of the magnet-brackets, limit the inward swing of the arms as their armatures turn on their pivots 18. These arms on their adjoining free ends are provided with non-conducting tip pieces 42 and the arms are instrumental in mechanically operating the reversing switch that includes two circuit makers and breakers for the two motor circuits.

Figure 6:
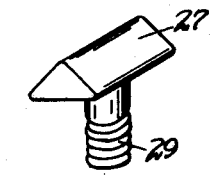
Figure 6 is a perspective view of one of the stationary contact heads (eight of which are used) of the duplex circuit maker which controls the operation of the motor in forward and reverse directions.
Figure 7:
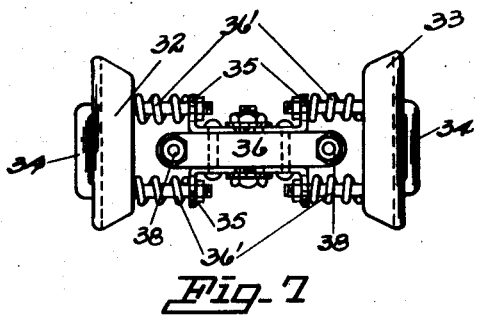
Figure 7 is a top plan view of the oscillatable, duplex, contact member showing the two end heads thereof and resilient supports.

The circuit makers of the reversing switch are indicated in Figure 8 as 25 and 26, and they include, each, a set of four stationary contact heads 27 and 28, one of which is shown in Figure 6. Each head, which is wedge-shaped in cross section, is provided with a bolt 29 which forms the terminal for the wires as 30 of the motor circuits. The heads are supported by their bolts in the upper frame 15 and nuts 24 are used to secure the connectors on the wires to the terminals.

These wedge shaped heads are interchangeable and each of the two sets comprises two pairs of vertically arranged heads that are insulated by means of the insulating strips 31, the two pairs of each set forming stationary contact points for use with the movable connectors or contact heads 32 and 33.

The connectors 32 and 33 are plates of conducting metal fashioned with beveled edges and the stationary heads of the vertically arranged pairs are spaced apart so that the upper and lower beveled edges of the connectors will simultaneously and frictionally engage against the stationary heads 27 or 28 to make the electrical circuit.

Figure 5:
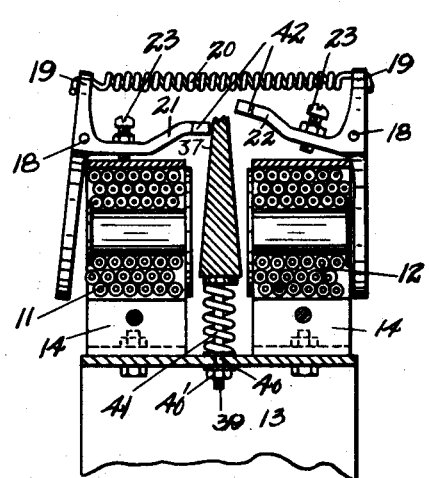
Figure 5 is a sectional detail view through a pair of electro-magnets of the control device showing one of the magnets energized and its armature attracted to its core, while the other armature is being employed to mechanically operate a circuit maker.

The connectors are carried at the upper end of a T-shaped, oscillatable connector supporting armature 37 that is located between the two magnets, and as best seen in Figures 2 and 5 the connectors 32 and 33 are perforated to slide on the two parallel arms of a U-shaped bracket 34 that form rigid parts of the holder and are mounted in angle plates 35 secured at the opposite sides of a cross-head 36 of the T-shaped supporting armature 37. By means of bolts or screws 38 the connectors 32 and 33 may be adjusted as to their height with relation to the cross head of the T-shaped armature 37, and by means of the springs 36' coiled about the legs of the U-shaped brackets 34 and interposed between the connectors and the angle plates, the connectors 32 and 33 are urged outwardly, so that as the T-shaped armature 37 swings laterally, as to the right or left in Figures 2 and 5, the connector will make contact at its edges with the tapered faces of the pairs of vertically arranged wedge-shaped heads 27 or 28 or stationary contact points to complete a circuit. The springs 36' in addition to forming a resilient support for the connectors, also perform the function of insuring a mechanical fit of the beveled edges of the connectors 32 and 33 against the beveled, or tapered edges of the stationary heads 27 or 28 to insure the necessary electrical contact.

The T-shaped armature 37 is mounted on the yoke 13 by means of a pin 39 that is rigid with and extends below the holder and through a slot 40 in the yoke. Between the yoke and the holder a spring 41 is interposed and coiled about the pin 39 in order to form a resilient support for the armature 37 and for the connectors 32 and 33 carried thereby, a nut 40' being threaded on the end of the pin 39 below the yoke for retaining the parts in position. The armature 37 is thus adapted to oscillate laterally between the magnets, and also to oscillate vertically if necessary to insure proper movement of the armature 37 and the connectors 32 and 33 when making or breaking a motor circuit.

The two locking arms 21 and 22 are employed to normally hold the two connectors out of contact with their heads, and they are also employed, alternately, or selectively, to mechanically release the armature 37, so that the energized magnet may draw the armature 37 toward it to effect the contact between the connector and its set of stationary contact heads.

The two arms 21 and 22 are provided at their free adjoining ends with tips 42 of non-conducting material that frictionally engage against opposite ends or sides of the holder when the latter is held by them in neutral or normal position. When a magnet is energized, as magnet 12 in Figure 5, the locking armature 17 is attracted thereto and the tip of arm 22 is drawn up from the armature 37, releasing it. When the magnet 12 is de-energized, the spring 20 equalizes its pull on the two lugs 19 and the two locking armatures are held away from their magnets, while the two connectors 32 and 33 are held away from their stationary sets 27 and 28. It is understood that when the magnet is de-energized, the spring 41 acts to return armature 37 to its normally vertical position, thereby breaking the contact of connector 32 with contact heads 27. The operation effected when the magnet 11 is energized is similar to that described, but the motor is reversed in its movement by the closing of the other motor circuit.

In Figure 8 a manually controlled reversible switch 43 is shown for closing one or the other of the electro-magnetic circuits, and this switch, which is under manual control of the driver of the tractor, is used to alternately lower and lift the plows through the reversible driving mechanism as described.

Having thus fully described my invention, what I claim as new and desire to secure by Letters Patent is:—

1. In an electro-magnet switch reversing mechanism, opposed sets of contact heads and each set forming terminals of a circuit, movable sets of connectors adapted to engage and close a circuit through their companion contact heads, spaced electro-magnets, an oscillatory connector supporting armature disposed between said electro-magnets to be shifted by either magnet when energized to engage a set of connectors with its companion set of contact heads to close a circuit, means yieldingly urging said armature toward a neutral position between said magnets, a movable switch locking armature abreast of the exterior of each electro-magnet and adapted to be attracted thereby when one of said electro-magnets is energized and each locking armature having a locking arm and said arms being adapted for opposing engagement with said supporting armature to lock the latter in a non-circuit closing position, a floating spring connected with said locking armatures and normally holding the latter retracted from said electro-magnets and engaging said locking arms against opposite sides of said supporting armature to lock the latter in a neutral and non-circuit closing position between said electro-magnets, and said spring yielding when one of said magnets is energized to shift its locking armature thereagainst and cause its locking arm to release said supporting armature for movement against the energized magnet, and said spring holding the remaining locking armature retracted and stops limiting retracting movement of said locking armatures under the action of said spring.

2. In an electro-magnet switch reversing mechanism, opposed sets of contact heads and each set forming terminals of a circuit, movable sets of connectors adapted to engage and close a circuit through their companion contact heads, spaced electro-magnets, an oscillatory connector supporting armature disposed between said electro-magnets to be shifted by either magnet when energized to engage a set of connectors with its companion set of contact heads and close a circuit, a spring retracted locking armature abreast of the exterior of each magnet and adapted to be attracted thereby when one of said magnets is energized and each locking armature having a locking arm and said arms being adapted for opposing engagement with said supporting armature when said locking armatures are retracted, and either locking armature being shiftable when its companion magnet is energized to shift its locking armature thereagainst and cause its locking arm to release said supporting armature, and the remaining locking armature being held retracted and stops limiting retracting movement of said locking armatures.

3. In an electro-magnet switch reversing mechanism, opposed sets of contact heads and each set forming terminals of a circuit, movable sets of connectors adapted to engage and close a circuit through their companion contact heads, a supporting armature for said connectors adapted to be moved in one direction for causing one set of connectors to close one circuit or in another direction to cause another set of connectors to close another circuit or occupy a neutral non-circuit closing position, selectively energized electro-magnets for moving said armature into either of said positions or releasing said armature to permit the latter to occupy a neutral position, and means actuated by said electro-magnets for locking said armature in its neutral position.

4. In an electro-magnet switch reversing mechanism, opposed sets of beveled contact heads and each set forming terminals of a circuit, sets of correspondingly beveled yieldingly mounted connectors adapted to engage and close a circuit through their companion contact heads, a yieldingly sustained armature supporting said connectors and yieldingly urged toward a neutral position, electro-magnets for moving said armature into either circuit closing position or permitting said armature to occupy a neutral position, and means actuated by said electro-magnets for locking said armature in a neutral position.

In testimony whereof I affix my signature.

WILBERT G. HORN.